United States Patent [19]

Medwedeff

[11] Patent Number: 4,558,864
[45] Date of Patent: Dec. 17, 1985

[54] HANDGRIP EXERCISING, COMPUTER GAME CONTROLLER

[76] Inventor: Marion C. Medwedeff, 213 Brandywyne, Friendswood, Tex. 77546

[21] Appl. No.: 620,384
[22] Filed: Jun. 13, 1984
[51] Int. Cl.⁴ .............................................. A63F 9/22
[52] U.S. Cl. .................................. 273/148 B; 272/68; 272/137
[58] Field of Search .................. 273/148 B, DIG. 28; 200/157, 329, 52 R; 272/67, 68

[56] References Cited

U.S. PATENT DOCUMENTS

| | | | |
|---|---|---|---|
| 3,400,793 | 9/1968 | Norris et al. | 272/67 X |
| 3,807,729 | 4/1974 | Sigma | 272/68 |
| 4,270,032 | 5/1981 | Dobberpuhl | 200/61.85 |
| 4,433,364 | 2/1984 | Noble | 272/137 X |
| 4,489,938 | 12/1984 | Darzinskis | 272/142 |

Primary Examiner—Richard C. Pinkham
Assistant Examiner—Scott L. Brown
Attorney, Agent, or Firm—Richard C. Litman

[57] ABSTRACT

A computer input device used simultaneously for amusement, physical exercise and strength measurement. The device consists of handgrips separated by a metal spring, a system of levers, a variable electrical resistor (potentiometer), conductor wires and a plug designed for insertion into the game controller socket of a home or arcade computer. The operator or player grasps and squeezes the handgrips of the device causing the levers to move the control arm of the potentiometer. The electrical resistance is varied an amount proportional to the amount of squeeze. The computer will run programs which "read" the potentiometer's resistance values and use these values to control the movement of graphic symbols on the computer's video display. For example, the operator will squeeze the handgrips to "throw", "hit" or "kick" a ball (for a distance and speed proportional to the squeeze) from one location of the computer's video display screen to a designated target at another location on the screen. The computer program will also measure, record and monitor the amount of physical exercise. The device in conjunction with a computer will provide exercise in a way that amuses and entertains the operator thereby promoting adherence to an otherwise boring program of physical therapy or development.

5 Claims, 3 Drawing Figures

HANDGRIP EXERCISING, COMPUTER GAME CONTROLLER

BACKGROUND OF THE INVENTION

1. Field of the Invention

This invention relates to a computer input device used simultaneously for amusement, physical exercise and strength testing or measurement wherein the operator grasps and squeezes the handgrips (which are separated by a metal spring) to control the movement of computer video game symbols. For example, the operator will squeeze the handgrips to "throw", "hit" or "shoot" a ball or missile from one location of the computer's video display screen to a designated target at another location on the screen. The computer programs will also measure, record and monitor the progress of the player's muscular strength. The device will provide exercise in a way that amuses and entertains the operator thereby promoting adherence to an otherwise boring program of physical therapy or development.

2. Prior Art

The use of "Joysticks", "Paddles" and "Trackballs" as input devices to home and arcade computers are well known and established as a means of controlling the movement of video game symbols. None of these devices, however, require deliberate strength on the part of the player. These devices are used to input changes of direction and have associated buttons that "throw", "hit" or "shoot" balls or missiles. The present invention does not input changes of direction, but rather the time and amount of force with which a ball or missile is thrown or shot. The present invention more accurately simulates the throwing of a ball or hurling of a missile than existing types of computer game controllers.

Handgrip exercising devices not intended for use with computers are well known, but such is not considered the art to which the present invention pertains.

Coin operated, strength testing devices are also well known. Some of these devices employ a handgrip mechanism. These devices, however, display a force reading only. They do not work in conjunction with a computer having an internally stored computer program for controlling the movement of video game symbols as well as measuring, recording and monitoring the progress of the player's muscular strength. Therefore such is also not considered the art to which the present invention pertains.

SUMMARY DISCUSSION OF THE INVENTION

It is therefore the object of the present invention to provide simultaneous amusement, physical exercise and strength measurement.

It is another object of the present invention to indicate to the computer a change in the amount of force for a corresponding change in time.

It is still another object of the present invention to provide a strength testing, computer game device.

An advantage produced by the use of the invention with a computer is that the computer can record a history of the physical development of each user.

Another advantage produced by the use of the invention with a home or arcade computer is the more realistic simulation of sporting games in which a ball is thrown, hit or kicked.

BRIEF DESCRIPTION OF THE DRAWINGS

Other objects and advantages of the present invention and a fuller understanding thereof may be had by reference to the following detailed description and claims taken together with the accompanying drawings, briefly described below, in which each part is given a reference number and wherein:

FIG. 1 is a front, perspective view of the present invention showing its overall configuration; while

DETAILED DESCRIPTION OF THE DRAWINGS

Figure 1:
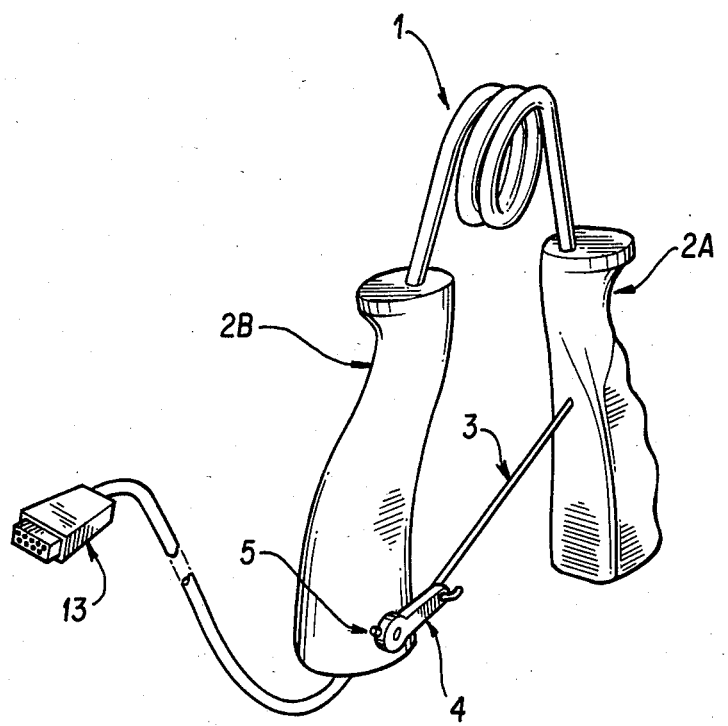

An orthographic projection of the embodiment of the present invention is shown in FIG. 1, wherein there is depicted the overall configuration of the device.

A coil spring 1 separates and serves as the resisitive force to the two handgrips 2A and 2B. A stiff but flexible wire 3 serves as a cantilever anchored at one end in grip 2A and looped loosely through a hole in the steering arm 4. The steering arm 4 fits on the axle shaft of an electrical potentiometer residing in the hollow end of grip 2B. A socket head cap screw 5 fits into a threaded hole in the collar of the steering arm 5 to provide a tight grip between the steering arm 4 and the axle of the potentiometer.

Figures 2, 3:
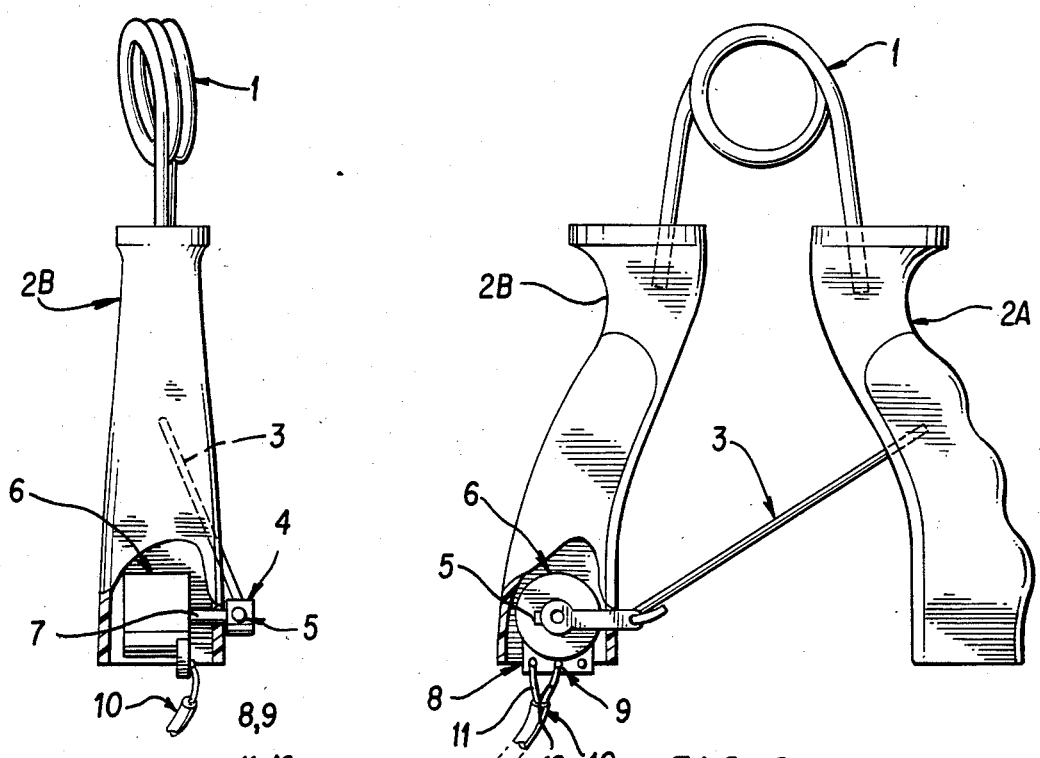
FIG. 2 is a side cut-away view of the embodiment of FIG. 1 showing its internal connections.
FIG. 3 is a front, cut-away view of the embodiment of FIG. 1 also showing its internal connections.

Referring to FIGS. 2 and 3 of the drawings, the potentiometer body 6 resides in the hollow end of grip 2B. The axle shaft 7 of the potentiometer fits through the collar of the steering arm 4. The socket head cap screw 5 prevents slippage of the steering arm and causes the shaft to be rotated when the two grips are squeezed and brought closer together. Two conductors 11 and 12 are soldered to the terminals 8 and 9 of the potentiometer 6. The conductors pass through the hollow insulator cable 10 and are soldered to the appropriate lugs in the socket 13 (9-position, D-Subminiature). See FIG. 1.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A computer game and control device and exercise apparatus which comprises:

a pair of elongated handles to be gripped by the hand throughout the width of the hand, means mounting the handles together for movement of the handles toward each other in pivotal movement about a pivot axis that is disposed longitudinally beyond the handles whereby the whole body of the hand grip is disposed beyond the pivot axis, the mounting means including spring means biasing the handles apart and yielding to enable the handles to be moved toward each other and the spring means being of sufficient strength whereby the handles can be moved in contact with each other only by exerting the full strength of the hand, an electrical switching device mounted in one of the handles, means mounted on the handles for actuating said switching device when said handles are pressed towards each other, a signal transmission means coupled with said switching device to transmit a signal from said switching device to a computer, so that when the handles are moved towards each other a signal proportional to the distance between the handles may be transmitted from the handles to a computer.

2. A computer game control and exercise apparatus as set forth in claim 1 wherein said spring means is a torsion spring.

3. A computer game and exercise device as set forth in claim 1 wherein said actuating means mounted on said handles constitute a series of levers.

4. A computer game control and exercise apparatus as set forth in claim 3 wherein said switching device is a potentiometer.

5. A computer game control and exercise apparatus as set forth in claim 3 wherein said means to transmit a signal is an electrical cord connected to said device and having a plug, on the end, capable of mating with a computer.

* * * * *